United States Patent Office 2,779,837
Patented Jan. 29, 1957

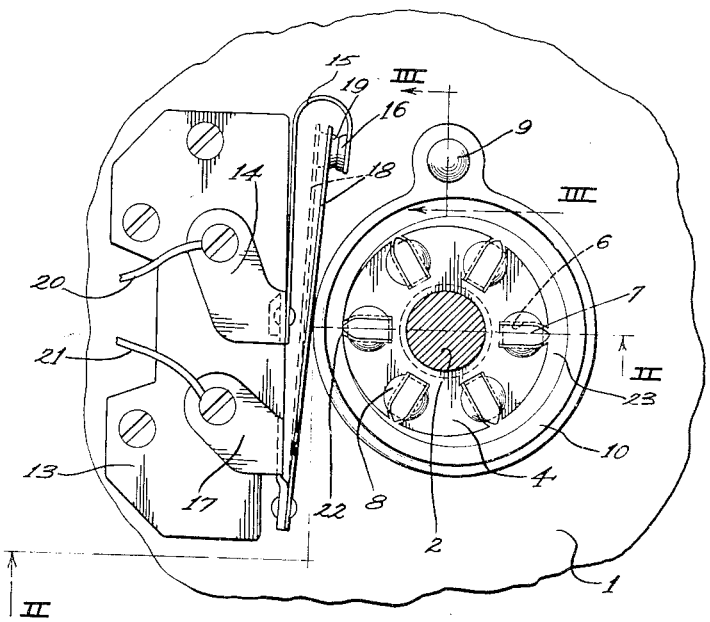

2,779,837
AUTOMATIC SWITCH CONTROL

Alfred W. Gardes, Detroit, Mich., assignor to Houdaille Industries, Inc., a corporation of Michigan Application February 24, 1954, Serial No. 412,325

9 Claims. (Cl. 200—80)

This invention relates to improvements in an automatic switch control, and more particularly to electrical switch control means highly desirable for use in association with a rotary shaft to control an electrical circuit by closing or opening the same in accordance with the speed of the shaft, although the invention may have other uses and purposes as will be apparent to one skilled in the art.

More specifically, the instant invention can well be used as a means for cutting out the starting winding in an electric motor, after the motor comes up to a predetermined speed. It can also be used as a governor to maintain a rotary element associated with a driving motor at a substantially constant speed by successively energizing and deenergizing the driving motor in order to maintain that constant speed. These uses are given by way of example, and not by way of limitation, in order to better present the instant invention.

In the past, many and various types of automatic switch control elements have been developed, but in most cases these formerly known control assemblies were more than desirably expensive, and occupied an objectionable amount of space. In other cases they were not as positive acting as desired and could easily become out of order. In still other instances, the control means themselves were not directly responsive to shaft speed, but only indirectly so and consequently were not desirably rapid and positive in their action.

With the foregoing in mind, it is an important object of the instant invention to provide an automatic switch control that is very simple and economical in construction, and which occupies a minimum of space when installed.

Another object of the invention is the provision of an automatic switch control which is directly responsive to shaft speed and effects a quick and positive actuation of an electrical switch in accordance with that shaft speed.

A further feature of the invention resides in the provision of an automatic switch control so designed as to reduce friction on moving parts and thereby prolong the life of the structure.

While some of the more salient features, characteristics and advantages of the instant invention have been above pointed out, others will become apparent from the following disclosures, taken in conjunction with the accompanying drawing, in which—

Figure 1 is a fragmentary front elevational view of an automatic switch control embodying principles of the instant invention, showing the same in operative association with a shaft;

Figure 2 is a fragmentary bottom plan sectional view of the structure of Fig. 1, taken substantially as indicated by the staggered section line II—II of Fig. 1, looking in the direction of the arrows; and Figure 3 is a fragmentary vertical sectional view, with one part shown in elevation, taken substantially as indicated by the line III—III of Fig. 1.

As shown on the drawings:

For purposes of clarity and adequate description, the instant invention is shown associated with an electric motor or the like, rather diagrammatically illustrated, and embodying a face or end plate 1 through which a rotary shaft 2 extends, suitable bearing means 3 being provided for the shaft Included in the instant invention is a disc-like spider 4 having a tubular hub 5 which may be press fitted or otherwise firmly secured to the shaft 2 to rotate therewith. The spider is provided with a plurality of sockets or indentations 6, and a central portion of each socket is struck out and bent upwardly into arcuate position to form an overlying tongue 7. Loosely trapped in each socket, beneath the respective tongue 7 is a ball 8. From the showing in Fig. 2, it will be seen that the spacing of the tongue 7 with respect to the socket is such as to permit some outward movement of the ball, but the ball cannot escape, since the end of the tongue and the socket edges are so spaced apart as to limit the outward movement of the ball to a predetermined extent.

A desired number or sockets and balls may be used in the spider 4, and in the illustrated instance I have shown six, although that particular number is not essential. As the shaft rotates, it will be apparent that the balls will all assume an outward position by virtue of centrifugal force when the shaft reaches a predetermined speed, and when the shaft drops below that predetermined speed, or stops, the balls will again recede into their sockets.

Above the shaft 2 a pivot pin 9 secured to the face plate 1 freely carries a ring 10 of any suitable material, but preferably of a molded thermoplastic or thermosetting plastic, nylon being a satisfactory material. It is desirable that the material be of such consistency as to provide long life notwithstanding the balls 8 rolling lightly against the inside surface thereof, which inside surface is preferably slightly curvate as seen at 11 in Fig. 2. With reference to Fig. 3 it will be seen that a suitable washer 12 may be used to keep the ring 10 in proper position so as to circumscribe or encircle the ball carrying spider 4.

Mounted on the face plate 1 to one side of the structure above described is an insulating plate or block 13. This plate carries a conductive bracket 14 to which a curvate conductive switch blade 15 is attached, this switch blade carrying a contact point 16 on its outer extremity. Another conductive bracket 17 also mounted on the block 13 carries an elongated inherently resilient switch blade 18 which carries a contact point 19 on its end in opposition to the contact point 16. The inherent resiliency of the blade 18 urges the contact point 19 into positive circuit making contact with the point 16 at all times. Suitable conductors 20 and 21 may lead away from the brackets 14 and 17 to a suitable source of power and whatever mechanism is controlled by the switch.

While the switch herein illustrated is somewhat diagrammatically shown, in many cases it may be desired to employ a micro-switch, or another switch that is quick acting, the illustrated switch being by way of example only.

It is desirable that the insulating ring 10 be normally eccentrically disposed relatively to the ball carrying spider 4, as clearly illustrated n Fig. 1. In that figure, it will be noted that the ring is in close proximity to the spider at the point 22, but there is considerable space 23 between the spider and ring on the opposite side. Several ways may be employed to acquire that normal eccentric disposition of the ring, namely having the pivot pin 9 offset slightly from the center line of the shaft, utilizing resilient means for urging the ring into the eccentric position, and in the illustrated instance resilient means are employed. In order to acquire these resilient means, the inherently resilient switch blade 18 has been relied upon, and bears against the ring when the switch is in closed position.

Now in operation, as soon as the shaft comes up to a predetermined speed, the balls will be thrown outwardly by centrifugal force sufficiently to move the ring into substantially concentric relationship with the spider and balls, and thus cause the ring to move the switch blade to the dotted line position, separating the contacts 16 and 19, and thus opening the electrical circuit. Assuming by way of example that the shaft 2 is a motor shaft, and the leads 20, 21 go to the starting winding of that motor, it will be obvious that as soon as the shaft reaches a predetermined speed the circuit through the starting winding will be opened, and will remain open as long as the motor stays above that predetermined speed, since the ring 10 will maintain its concentric relationship and hold the switch open.

Again, by way of example, the shaft 2 may be connected to an electric driving motor, and it is desired that the instant invention function as a governor to maintain the speed of that shaft substantially constant. When so utilized, the operation is substantially the same, and should the shaft pass above the desired speed, the circuit to the driving motor will be opened, and should the shaft fall below desired speed, the circuit will again be closed.

The device might also be utilized by an obvious change in switch structure, as a means for cutting in a second piece of operative mechanism electrically controlled by the leads 20 and 21, after shaft 2 reaches a certain speed. Other uses for the invention will of course be apparent to one skilled in the art.

From the foregoing, it is apparent that I have provided an automatic switch control which is simple and yet positive in its action, which occupies a minimum space, which is economical and easy to assemble and mount in position, which is highly durable, and which requires practically little or no attention while operating.

It will be understood that modifications and variations may be effected wthout departing from the scope of the novel concepts of the present invention.

I claim as my invention:

1. In an automatic switch control, supporting means, a rotary shaft extending therethrough, a spider on said shaft having ball sockets therein, a ball loosely trapped in each said socket free to move a limited distance radially by centrifugal force, an insulating ring pivoted to said supporting means and surrounding said spider and balls, said ring being eccentric with respect to said spider whereby when the shaft rotates to a predetermined speed the balls will force the ring into concentric relationship with the spider, and switch means actuated by said ring upon reaching concentric position.

2. In an automatic switch control, supporting means, a rotary shaft extending therethrough, a spider on said shaft having ball sockets therein, a ball loosely trapped in each said socket free to move a limited distance radially by centrifugal force, an insulating ring pivoted to said supporting means and surrounding said spider and balls, and resilient switch means contacting said ring and holding the same in eccentric position relatively to said spider, said balls forcing said ring into concentric relationship when said shaft reaches a predetermined speed and actuating said switch means.

3. In an automatic switch control, supporting means, a rotary shaft extending therethrough, a spider on said shaft having ball sockets therein, a ball loosely trapped in each said socket free to move a limited distance radially by centrifugal force, an insulating ring pivoted to said supporting means and surrounding said spider and balls, and switch means including a resilient contact controlling member urging said ring into eccentric relationship with said spider below a predetermined shaft speed, said balls forcing said ring outwardly to actuate said resilient member when said shaft reaches a predetermined high speed.

4. In an automatc speed responsive switch control, ball holding means for fixed securement to a rotary shaft, a plurality of balls loosely held by said means and movable radially of the shaft a limited distance in response to shaft speed, a pivoted ring circumscribing said balls and normally assuming an eccentric position relatively to said shaft but being forced by contact with said balls to a concentric position at a predetermined speed, and switch means actuated by said ring.

5. In an automatic speed responsive switch control, ball holding means for fixed securement to a rotary shaft, a plurality of balls loosely held by said means and movable radially of the shaft a limited distance in response to shaft speed, a pivoted ring circumscribing said balls and normally assuming an eccentric position relatively to said shaft but being forced by contact with said balls to a concentric position at a predetermined speed, and a resilient contact carrying switch element normally urging said ring to eccentric position and the resiliency of which is overcome by ball pressure at a predetermined speed of the shaft.

6. In an automatic switch control, centrifugally responsive means for securement to a rotary shaft and movable a limited distance radially of the shaft in response to shaft speed, a pivoted member contacting said means, said member movable in a direction normal to the axis of said shaft, and an electrical switch directly actuated by movement of said pivoted member.

7. In an automatic switch control, centrifugally responsive means for securement to a rotary shaft and movable a limited distance radially of the shaft in response to shaft speed, an arcuate member at least partially encircling said means and in contact therewith movable in a direction normal to the axis of said shaft, and switch means directly actuated by said arcuate member.

8. In an automatic switch control, centrifugally responsive means for securement to a rotary shaft and movable a limited distance radially of the shaft in response to shaft speed, a swingable member adjacent said means movable in a direction normal to the axis of said shaft, resilient means urging said member into contact with said centrifugally responsive means and which are overcome by said member upon a predetermined shaft speed, and electrical contact elements controlled by said member.

9. In an automatic switch control, centrifugally responsive means for connection to a rotary shaft and movable a limited distance radially of the shaft in response to shaft speed, a ring member concentric with said means and mounted to move in a plane normal to the shaft axis, and an electrical switch directly actuated by a predetermined movement of said ring.

References Cited in the file of this patent

UNITED STATES PATENTS

| | | |
|---|---|---|
| 1,122,543 | Schaeffer | Dec. 29, 1914 |
| 1,406,432 | Winter | Feb. 14, 1922 |
| 1,698,322 | Stobe | Jan. 8, 1929 |
| 1,910,245 | Harrelson | May 23, 1933 |
| 2,138,801 | Young | Nov. 29, 1938 |
| 2,187,207 | McCabe | Jan. 16, 1940 |